(12) United States Patent
Shimada et al.

(10) Patent No.: US 6,253,120 B1
(45) Date of Patent: Jun. 26, 2001

(54) POSITION AND/OR FORCE CONTROLLING APPARATUS USING SLIDING MODE DECOUPLING CONTROL

(75) Inventors: Akira Shimada; Yoshinobu Ohtachi, both of Narashino; Tsutomu Mita, Yokohama, all of (JP)

(73) Assignee: Seiko Seiki Kabushiki Kaisha (JP)

( * ) Notice: Subject to any disclaimer, the term of this patent is extended or adjusted under 35 U.S.C. 154(b) by 0 days.

(21) Appl. No.: 09/067,842

(22) Filed: Apr. 27, 1998

(30) Foreign Application Priority Data

Apr. 28, 1997 (JP) .................................................. 9-124933
Nov. 21, 1997 (JP) .................................................. 9-337690

(51) Int. Cl.[7] ............................. G05B 15/00; B25J 9/00
(52) U.S. Cl. ............................. 700/260; 700/53; 700/54; 901/8; 901/3; 901/5
(58) Field of Search ............................. 700/5, 260, 261, 700/262, 263; 901/53, 54, 8, 3, 5

(56) References Cited

U.S. PATENT DOCUMENTS

| | | | | |
|---|---|---|---|---|
| 4,725,942 | * | 2/1988 | Osuka ................................. | 364/150 |
| 4,753,048 | * | 6/1988 | Asada et al. ......................... | 51/281 |
| 4,860,215 | * | 8/1989 | Seraji ................................ | 364/513 |
| 5,371,669 | * | 12/1994 | Venkataraman et al. .......... | 364/190 |

FOREIGN PATENT DOCUMENTS

428742A1  5/1991 (EP).
441983A1  8/1991 (EP).
494500A1  7/1992 (EP).

OTHER PUBLICATIONS

Patent Abstracts of Japan, vol. 17, No. 432 (P–1589) Aug. 10, 1993.

* cited by examiner

*Primary Examiner*—Robert Beausoleil
*Assistant Examiner*—Tim Vo
(74) *Attorney, Agent, or Firm*—Adams & Wilks

(57) ABSTRACT

An interacting term existing in a control system is decoupled on the basis of a regular condition of a decoupling matrix. Then, an hyperplane σ which has been obtained to satisfy the Lyapunov stability condition is designed. A control quantity is converged along the hyperplane σ. In this case, even if the uncertainty is generated in a C matrix for connecting a state variable x(t) and an output y(t) of an object to be controlled, it is possible to converge the control quantity while always satisfying the Lyapunov stability condition. A non-linear input gain $k_i(x,t)$ used in the control system is designed to be greater than a predetermined value when there is no uncertainty in the C matrix to satisfy the Lyapunov stability condition. Also, a control input signal based upon the sliding mode decoupling control is converted to an articulation torque by a Jacobian. Also, for the control input signal, reverse dynamics of non-linear force are added thereto.

8 Claims, 9 Drawing Sheets

F I G. 7
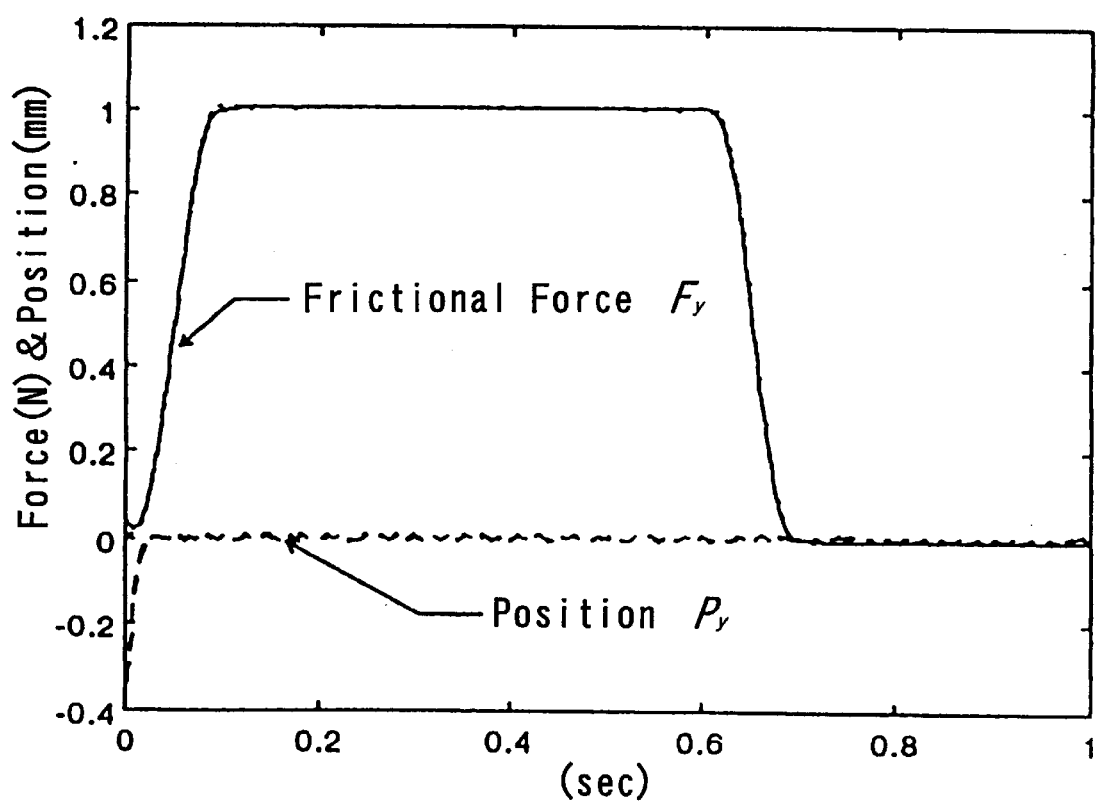

POSITION AND/OR FORCE CONTROLLING APPARATUS USING SLIDING MODE DECOUPLING CONTROL

BACKGROUND OF THE INVENTION

1. Field of the Invention

The present invention relates to a position and/or force controlling apparatus using a sliding mode decoupling control, and more particularly to position and/or force controlling apparatus using sliding mode decoupling control which enables robust control responsive to change and a high precision machining of a complicated curved surface and which may suppress the generation of chattering even if elasticity or frictional coefficient of a grind surface of a workpiece to be in contact with a machining device has uncertainty and changes in an unknown manner.

2. Description of the Related Art

Conventionally, a grinding robot as shown in FIG. 8 is known. An object is pushed against a buff, a grinding stone and a polishing belt driven in the same direction so that grinding is performed by controlling the frictional force and position of the grinding surface. In FIG. 8, a grinding device 1 is a buff grinding device, a rotary type grinding device, or the like using a PVA (polyvinyl alcohol) grinding stone or the like. The buff 5 is driven by motors 3a and 3b. A workpiece or work 7 is gripped by a robot 9 and is pushed in a direction x against the buff 5 by a force f(t) to thereby grind a predetermined surface. The buff 5 is moved in a direction y at a velocity V(t) (which is defined as a tangential directional velocity of the buff 5 at a contact point). In this case, t is the grinding time when the work 7 is pushed against the buff 5. In this case, control is performed by adjusting a force $f_{mx}(t)$ (not shown) in the direction x which force is given to the work 7 by the robot 9 so that the force f(t) has a predetermined level. The control during this period is kept constant even if the grinding device 1 is changed as shown in FIG. 9.

However, since the conventional control is a simple control which applies the same force f(t) only during the grinding operation even if, for example, the buff 5 is clogged so that the frictional force F(t) (which is the tangential frictional force at a contact point of the outer circumference of the grinding device 1) between the buff 5 and the work 7. Thus, there is a concern that grinding may not sufficiently be performed. In the ideal control for this case, it is necessary to increase the force f(t) or to elongate the grinding time t corresponding to the decrement of the frictional force F(t). Namely, the frictional coefficient between the buff 5 and the work 7 is finely changed in accordance with various conditions. Accordingly, control of the force $f_{mx}(t)$ in the direction x while supervising the force f(t) in the direction x can not achieve stable grinding work. On the other hand, the essence of the grinding work is under the relation which is equal to the total amount of the energy given from the grinding device 1 (hereinafter referred to as a grinding energy). The reason why it is necessary to enlarge the force f(t) or elongate the grinding time t in the control when the above-described clogging occurs is that it is required to keep the grinding energy constant. Therefore, in order to obtain a stable high quality grinding surface without being influenced by a change in the frictional coefficient, it is ideal to control the grinding energy by the robot 9.

Also, it is possible to perform the grinding energy control by using a sliding mode control. However, the sliding mode control which has been performed conventionally may be designed only in the case where det(CB)≠0 where the object to be controlled is expressed by formula 1.

$$\dot{x}(t) = Ax(t) + Bu(t) + Bd(x,t),\ y(t) = Cx(t) \qquad \text{[formula 1]}$$

For this reason, there is a predetermined restriction for the arrangement of sensors or the like.

It is possible to consider that the elasticity or the frictional coefficient of the grinding surface of the work 7 to be brought into contact with the grinding device 1 has an uncertainty and would be changed in an unknown manner. In such a case, there is a concern that it would be difficult to converge the control quantity to always satisfy the Lyapunov stability condition.

Also, even if the above-described problem is solved, since a method for applying the grinding energy control method using the sliding mode control to a multi-articulated grinding robot is not clarified, it is impossible to grind a complicated curved surface due to the restriction of the degree of freedom for the robot. Furthermore, in the sliding mode control, since the non-linear term appearing in the notion equation is regarded as an extrinsic turbulence and the non-linear control input gain is increased to attain the robustness, there is a concern that the chattering intrinsic to the sliding mode control would be likely to occur.

SUMMARY OF THE INVENTION

In view of the foregoing defects inherent in the prior art, it is an object of the present invention to provide a position and/or force controlling apparatus which makes it possible to perform a robust control which may cope with a change even when an elasticity or a frictional coefficient of the machining surface in which a work is brought into contact with a machining device has uncertainty and changes in an unknown manner, and in which high precision machining of a complicated curved surface is possible and which may suppress generation of chattering.

In order to attain these objects, according to the present invention, a position and/or force controlling apparatus using a sliding mode decoupling control system having decoupling means for decoupling an interacting term existing in the control system on the basis of a regular condition of a decoupling matrix and a sliding mode controlling means for converging a control quantity along a hyperplane which is sought to satisfy the Lyapunov stability condition for the control system decoupled by the decoupling means is characterized in that gain for a non-linear input existing in the control system is set at a value to satisfy the Lyapunov stability condition so that the control quantity converges on the hyperplane in a stable manner even when there is an uncertainty in the C matrix. The C matrix connects state variables with an output of the object to be controlled. It is preferable to set the gain to be greater than a gain when there is no uncertainty in the C matrix.

The interactive term existing in the control system is decoupled on the basis of the regular condition of the decoupling matrix. As a result, the x-direction control and the y-direction control or the position control and the force control or the like may be performed in a separate manner from each other without any interference. Then, a hyperplane obtained to satisfy the Lyapunov stability condition is designed, and the control quantity is converged along the hyperplane. In this case, gain for nonlinear input factor existing in the control system is designed to be greater than a predetermined value for the C matrix without uncertainty, where the magnitude of said gain is large enough to satisfy the Lyapunov stability condition so that the control quantity converges on the hyperplane in a stable manner with satisfaction of the Lyapunov stability condition even when there is uncertainty in the C matrix.

The position and/or force controlling apparatus using the sliding mode decoupling control system according to the present invention is further characterized by comprising a machining device for machining a predetermined surface of a work, and a robot for pressing the work against the machining device or a robot for pressing the machining device against the work fixed at a predetermined position in a space, the control quantity including at least one of a frictional force, in a tangential direction, generated in the machining surface in which the work is in contact with the machining device, and a position in the tangential direction, and the uncertainty of the C matrix depending upon at least one of changes of an elasticity coefficient and a frictional coefficient of the machining surface.

The sliding mode decoupling control is used to control a robot for pressing the work against the machining device (or a robot for pressing the machining device against the work). The control quantity of the object to be controlled includes at least one of the frictional force in the tangential direction and the position in the tangential direction. In this case, the uncertainty of the C matrix depends upon at least one of the changes of the elasticity coefficient and the frictional coefficient of the machining surface. However, the gain for non-linear input existing in the control system is designed to be greater than the predetermined value when there is no uncertainty of the C matrix to satisfy the Lyapunov stability condition so that the control quantity may be converged always in a stable manner along the hyperplane.

Furthermore, according to the present invention, a position and/or force controlling apparatus using a sliding mode decoupling control for controlling at least one of a position and a frictional force through a robot having at least one articulation is characterized by comprising a control object controlled and designed in advance on the basis of an equation of motion in an operation coordinate system of the robot in which the equation of motion in an articulation coordinate system of the robot is converted from the articulation coordinate system to the operation coordinate system by a Jacobian, a sliding mode decoupling controlling means for compensating for a non-linearity inherent in the robot on the basis of at least one of errors between a target value of a force on the operation coordinate system and a detection value of a force and between a target value of a position on the working coordinate system and a detection value of the position and for giving a strong robustness to the robot, an articulation torque calculating means for calculating each articulation torque of the robot on the basis of a control input signal obtained by the sliding mode decoupling controlling means, and an articulation drive means for driving each articulation on the basis of each articulation torque calculated by the articulation torque calculating means.

The present invention is applied to a robot for controlling at least one of the position and the frictional force of the object to be controlled. The robot includes at least one articulation. The equation of motion in the articulation coordinate system of this robot is converted from the articulation coordinate system to the operation coordinate by using the Jacobian. Namely, the equation of motion in the operation coordinate system of the robot is obtained. Then, the object to be controlled is designed in advance on the motion equation. The sliding mode decoupling controlling means compensates for a non-linearity inherent in the robot on the basis of at least one of errors between a target value of a force on the operation coordinate system and a detection value of a force and between a target value of a position on the working coordinate system and a detection value of the position and for giving a strong robustness to the robot. The sliding mode decoupling controlling means gives a strong robustness to the robot. In this case, the sliding mode decoupling controlling means includes the above-described decoupling means and the sliding mode controlling means. The articulation torque calculating means calculates each articulation torque of the robot on the basis of a control input signal obtained by the sliding mode decoupling controlling means. Then, the articulation drive means drives each articulation on the basis of each articulation torque calculated by the articulation torque calculating means. As a result, the sliding mode decoupling control may be applied to the robot. In the perpendicular manipulator, the high precision machining of the complicated surface which could not be obtained due to the limit of the degree of freedom may be attained.

Moreover, according to the present invention, the articulation torque calculating means calculates each articulation torque of the robot on the basis of an addition signal in which reverse dynamics representative of a known parameter change are added to the control input signal.

For the known parameter change like the function term of the articulation angle in the motion equation intrinsic in the robot, the reverse dynamics are considered. Here, the known parameter change is a torque generated by at least one of, for example, a viscous friction, a centrifugal force, a Coriolis force and gravitation. The non-linear input of the sliding mode decoupling control is limited to compensate for the same errors as the unknown changes of these parameters. Thus, it is possible to suppress the generation of chattering the robot using the sliding mode decoupling control.

BRIEF DESCRIPTION OF THE DRAWINGS

In the accompanying drawings:

FIG. 7 is a view showing results of simulation;

DESCRIPTION OF THE PREFERRED EMBODIMENTS

Figure 1:
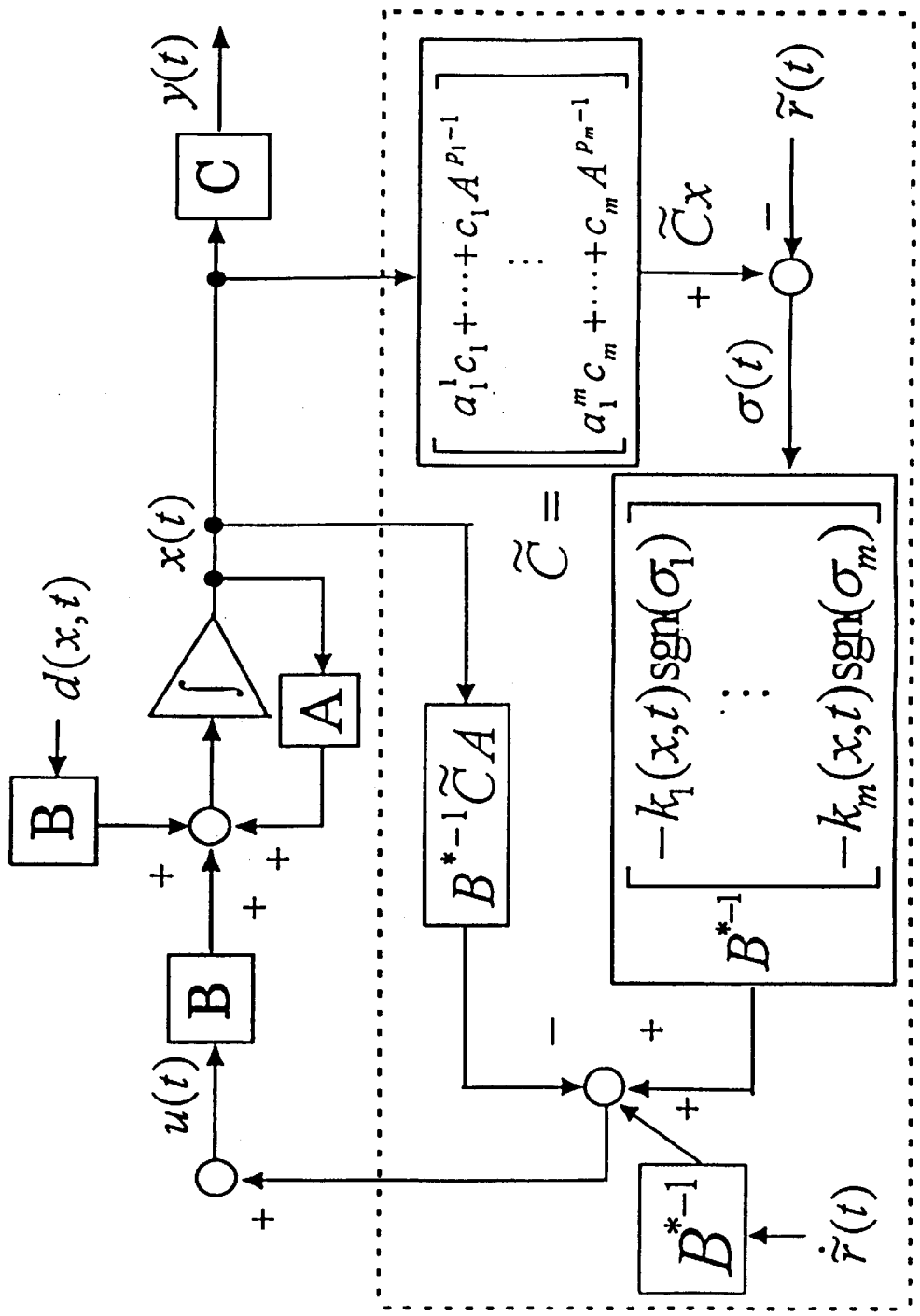
FIG. 1 is a block diagram of an overall sliding mode decoupling controlling system.

An embodiment of the present invention will now be described. First of all, a sliding mode decoupling control system in the case where an output formula meets det (CB)=0 will be described (reference literature concerning the sliding mode decoupling control system: T. Mita, T. Suzuki, A. Shimada, *Robust Decoupling Control Via Sliding Mode Control,* 1996 IEEE Work Shop on Variable Structure Systems, P. 20–25; and Mita, Suzuki and Shimada, *VSS Decoupling Control and Function of Zero Point,* Electric Association Industrial Measurement Control Research IIC-97-26, Mar. 17, 1997). The object to be controlled conforms to formula 1 as described above. In this case, A(n×n), B(n×m), C(m×n) and (x, t) are non-linear terms whose size is known. The formula 2 is established, det(CB)≠0 is not established, and the formula 3 is established.

$$\|d(x,t)\| \leq M(x,t) \qquad \text{[formula 2]}$$

$$c_i B=0, \ldots, c_i A^{pi-2} B=0, c_i A^{pi-1} B \neq 0 \qquad \text{[formula 3]}$$

where $c_i$ is the i-th row of a C matrix. As is well known, if the formula 4 is regular, it is possible to decouple it.

$$B^* = \begin{bmatrix} c_1 A^{p1-1} B \\ \ldots \\ c_m A^{pm-1} B \end{bmatrix} \qquad \text{[formula 4]}$$

Subsequently, the formula 5 of a coefficient matrix is defined by C and a target value r which may be differentiated, and a hyperplane σ is designed. In this case, the formula 6 is established.

$$\tilde{C}, \tilde{r} \qquad \text{[formula 5]}$$

$$\tilde{C}B = B^* \qquad \text{[formula 6]}$$

Also, formulae 7 to 9 are defined as follows:

$$\tilde{C}=[\tilde{c}_1, \ldots, \tilde{c}_m]^T \tilde{c}_i = a_1^i c_i + a_2^i c_i A + \ldots + a_{pi-1}^i c_i A^{pi-2} + c_i A^{pi-1} \qquad \text{[formula 7]}$$

$$\tilde{r}=[\tilde{r}_1, \ldots \tilde{r}_m]^T \tilde{r}_i = a_1^i r_i + a_2^i r_i^{(1)} + \ldots + a_{pi-1}^i r_i^{(pi-2)} + r_i^{(pi-1)} \qquad \text{[formula 8]}$$

$$\sigma = \tilde{C}x - \tilde{r} \qquad \text{[formula 9]}$$

In this case, formulae 10 and 11 are used as control inputs.

$$u = -(\tilde{C}B)^{-1}\tilde{C}Ax + (\tilde{C}B)^{-1}\tilde{u} + (\tilde{C}B)^{-1}\tilde{r} \qquad \text{[formula 10]}$$
$$= -B^{*-1}\tilde{C}Ax + B^{*-1}\tilde{u} + B^{*-1}\tilde{r}$$

$$\tilde{u} = -\begin{bmatrix} k_1(x,t)\text{sgn}(\sigma_1) \\ \ldots \\ k_m(x,t)\text{sgn}(\sigma_m) \end{bmatrix} \qquad \text{[formula 11]}$$

The formula 13 can be determined by expressing the candidate of the Lyapunov function for each row is the formula 12.

$$V_i = \sigma_i^2/2 \geq 0 \qquad \text{[formula 12]}$$

$$\dot{V}_i \qquad \text{[formula 13]}$$

From formula 14, if gain $k_i(x,t)$ is selected by formula 15, $V_i$ is the Lyapunov function to obtain formula 16. The right upper suffix (k) means the k-th order differentiation. As shown in the formula 15, the gain $k_i(x,t)$ is selected at a value larger than the predetermined value, expressed by the right part of the formula 15.

$$\dot{V}_i = \sigma_i(-k_i \text{sgn}(\sigma_i) + \tilde{c}_i Bd) = |\sigma_i|(-k_i \pm \tilde{c}_i Bd) \qquad \text{[formula 14]}$$

$$k_i(x,t) > \|\tilde{c}_i B\| M(x,t) \qquad \text{[formula 15]}$$

$$\sigma_i^{(k)} \to 0, k \geq 0 \qquad \text{[formula 16]}$$

Also, the requisite and sufficient condition for stabilizing the equivalent linear system when the formula 17 is established is that the unchanged zero point of the formula 18 is stable and the same condition is equivalent to the condition that the unchanged zero point (C, A, B) is stable in the stable multi-term formula of all of $h_i(s)=0$ (i=1 to m) by the formulae 19 to 21.

$$\sigma_i^{(k)} = 0, k \geq 0 \qquad \text{[formula 17]}$$

$$(\tilde{C}, A, B) \qquad \text{[formula 18]}$$

$$\det\begin{bmatrix} A-sI & B \\ \tilde{C} & 0 \end{bmatrix} = \det H(s) \det\begin{bmatrix} A-sI & B \\ C & 0 \end{bmatrix} \qquad \text{[formula 19]}$$

$$H(s) = \text{diag}(h_1(s), h_2(s), \ldots, h_m(s)) \qquad \text{[formula 20]}$$

$$hi = a_1^i + a_2^i s + \ldots + a_{pi-1}^i s^{pi-2} + s^{pi-1} \qquad \text{[formula 21]}$$

However, since there is no zero point in case of formula 22, $h_i(s)=0$ (i=1 to m) may be selected to the stable multi-term formula.

$$n = \sum_{i=1}^{m} p_i \qquad \text{[formula 22]}$$

An entire block diagram of the sliding mode decoupling control system described above is shown in FIG. 1.

The correspondence when the C matrix has the uncertainty will now be described.

The C matrix has the uncertainty represented by the formulae, $c_i = c_{0i} + \delta_{i,c0i}$, $\delta_{i,min} \leq \delta_i \leq \delta_{i,max}$, and $|\delta_i| < 1$. The case where the output y may be observed directly is considered. The value of σ of the hyperplane number 9 is exactly obtained but the formula 23 of the control input number of 10 has to use the formula 24 or 25 corresponding to $c_{0i}$. Then, in order to make V the Lyapunov function, it is necessary to correct the gain $k_i(x,t)$ of the formula 15 in accordance with the formula 26.

$$\tilde{C} \qquad \text{[formula 23]}$$

$$\tilde{C}_0 \qquad \text{[formula 24]}$$

$$B_0^* \qquad \text{[formula 25]}$$

$$k_i(x,t) > \|\tilde{c}_i B\| M(x,t) + (1+\delta_{i,min})^{-1} \delta_{i,max} |\dot{r}_i| \qquad \text{[formula 26]}$$

Namely, the gain $k_i(x,t)$ is selected at a value greater than the predetermined value, expressed at the right part of the formula 26, which is the gain when there is no uncertainty in the C matrix.

Figure 2:
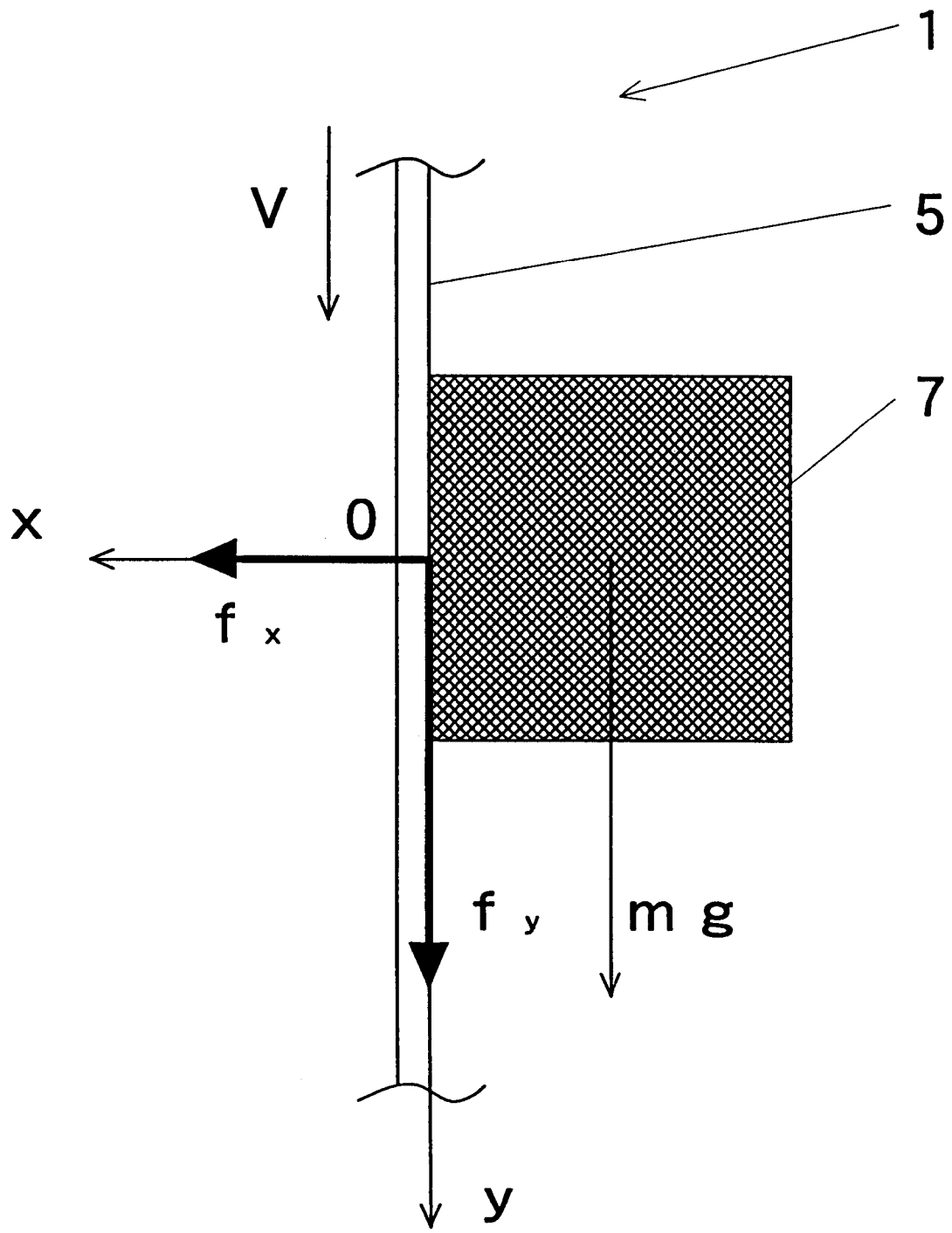
FIG. 2 is a view showing a model of a control system.
Figure 8:
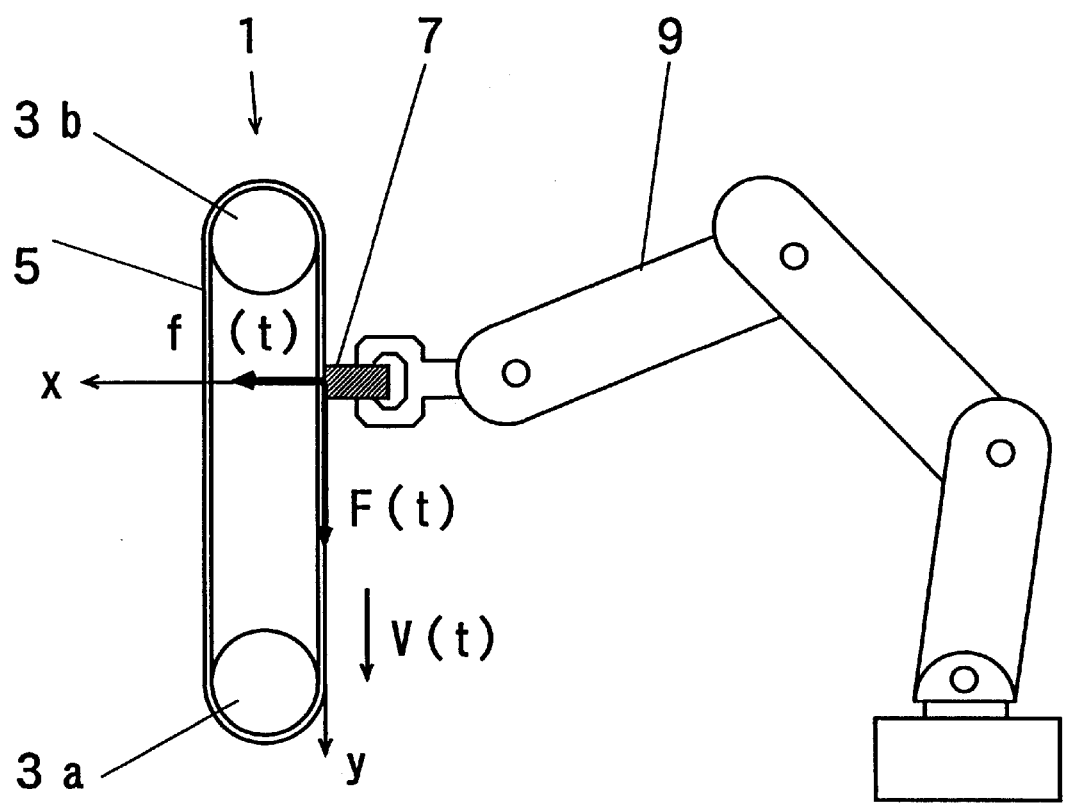
FIG. 8 is a structural view showing an overall grinding robot.
Figure 9:
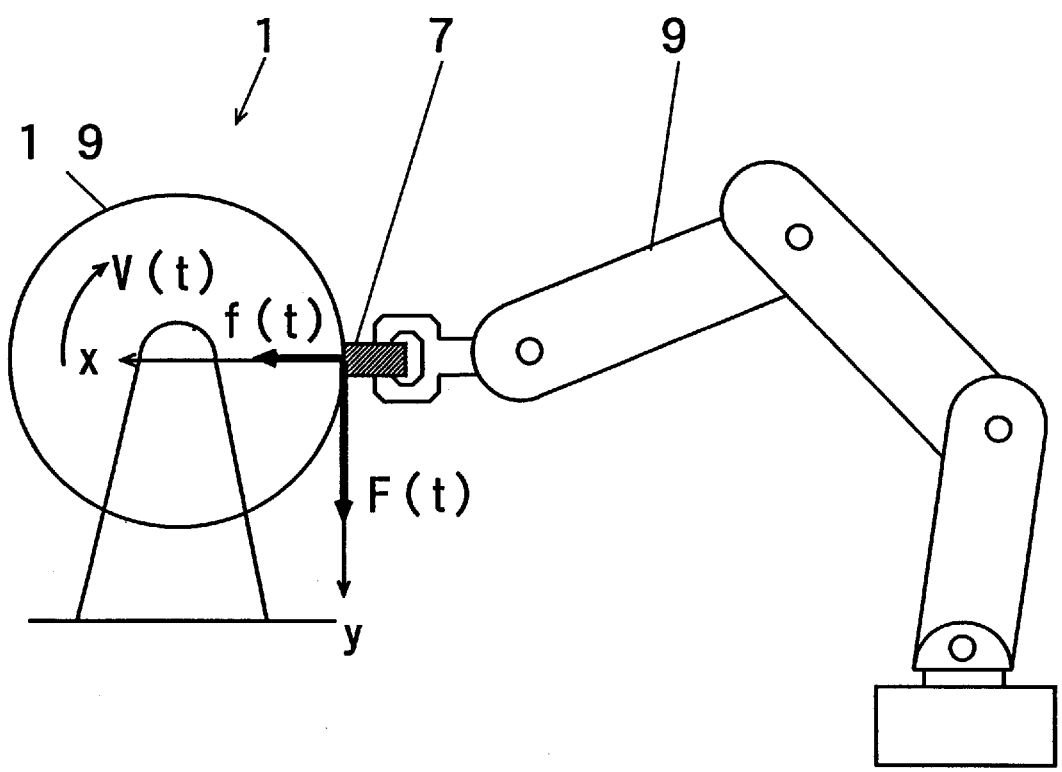
FIG. 9 is a structural view showing an overall grinding robot when the grinding device is formed in accordance with another embodiment.

A force control of the grinding robot to which the above-described control methods is actually applied will now be described. The overall structural view of the grinding robot is the same as that shown in FIG. 8. A control system model in this case is shown in FIG. 2. In FIG. 2, the control on the robot side in the case where the robot 9 (not shown) depresses the work 7 having a mass m against the grinding device 1 having the elastic coefficient k will be considered. In this case, $P_x$ is the position in the direction x, $P_y$ is the position in the direction y, $f_x$ is the force given in the direction x of the grinding device 1, $f_y$ is the frictional force in the direction y, $f_{mx}$ is the drive force given in the direction x by the robot 9, $f_{my}$ is the drive force given in the direction y by the robot 9, and α is the frictional coefficient. In this case, the control specification is such that the robot effects the force control in the direction x so that the frictional force in the direction y becomes a predetermined value to thereby effect the position control. Also, the detection of the force is performed by using force sensors (not shown). The motion equations for the respective directions x and y are given by the formula 27.

$$m\ddot{P}_x + k \cdot P_x = f_{mx}, m\ddot{P}_y + \alpha \cdot k \cdot P_x = f_{my}, mg \, f_x = k \cdot P_x, f_y = \alpha \cdot f_x = \alpha \cdot k \cdot P_x$$ [formula 27]

In this case, the state equation is produced by replacing as in formula 28. However, the relationships, $k = k_0 + \Delta k$ and $\alpha = \alpha_0 + \Delta \alpha$, the model error represented by $\Delta$ is formed together into an extrinsic turbulence term d.

$$x_1 = P_x, x_2 = P_y, x_3 = \dot{x}_1, x_4 = \dot{x}_2, u_1 = f_{mx}, u_2 = f_{my}, y_1 = f_y, y_2 = P_y$$ [formula 28]

A, B, C and d are given by the formula 29.

$$A = \begin{bmatrix} 0 & 0 & 1 & 0 \\ 0 & 0 & 0 & 1 \\ -k_0/m & 0 & 0 & 0 \\ -\alpha_0 k_0/m & 0 & 0 & 0 \end{bmatrix} \; B = \begin{bmatrix} 0 & 0 \\ 0 & 0 \\ 1/m & 0 \\ 0 & 1/m \end{bmatrix}$$ [formula 29]

$$C = \begin{bmatrix} a \cdot k & 0 & 0 & 0 \\ 0 & 1 & 0 & 0 \end{bmatrix}$$

$$d = \begin{bmatrix} d_1 \\ d_2 \end{bmatrix} = \begin{bmatrix} -\Delta k x_1 \\ -(\alpha_0 \Delta k + \Delta \alpha k_0 + \Delta \alpha \Delta k) x_1 + mg \end{bmatrix}$$

However, the formula 30 is established.

$$\|d\| < M$$ [formula 30]

$\delta_1$ meets the relationship, $\delta_{1,min} \leq \delta_i \leq \delta_{1,max}$ and $\alpha_0 \Delta k + \Delta \alpha k_0 + \Delta \alpha \Delta k = \delta_1 \alpha_0 k_0$, $\delta_2 = 0$. $p_1 = p_2 = 2$ is given from $c_{01}B = [0,0]$, $c_{02} = [0,0]$, $c_{01}AB = [\alpha_0 k_0/m, 0]$, and $c_{02}AB = [0, 1/m]$ to obtain the regular formula 25. The formula 31 becomes the formula 32.

$$\tilde{C}_0, \tilde{r}, \sigma$$ [formula 31]

$$C_0 = \begin{bmatrix} \tilde{c}_{01} \\ \tilde{c}_{02} \end{bmatrix} = \begin{bmatrix} a_1^1 c_{01} + c_{01}A \\ a_1^2 c_{02} + c_{02}A \end{bmatrix}$$ [formula 32]

$$= \begin{bmatrix} a_1^1 \alpha_0 k_0 & 0 & \alpha_0 k_0 & 0 \\ 0 & a_1^2 & 0 & 1 \end{bmatrix}$$

$$\tilde{r} = \begin{bmatrix} \tilde{r}_1 \\ \tilde{r}_2 \end{bmatrix} = \begin{bmatrix} a_1^1 f_{ry} + \dot{f}_{ry} \\ a_1^2 P_{ry} + \dot{P}_{ry} \end{bmatrix}$$

$$\sigma = \begin{bmatrix} \sigma_1 \\ \sigma_2 \end{bmatrix} = \begin{bmatrix} a_1^1 (f_y - f_{ry}) + (\dot{f}_y - \dot{f}_{ry}) \\ a_1^2 (P_y - P_{ry}) + (\dot{P}_y - \dot{P}_{ry}) \end{bmatrix}$$

The control inputs $u_1$ and $u_2$ become the formulae 33 to 35 by using the formula 26 by replacing the formula 23 of the formula 10 by the formula 24 and B* by the formula 25.

$$B_0^{*-1} = \begin{bmatrix} m/\alpha_0 k_0 & 0 \\ 0 & m \end{bmatrix}$$ [formula 33]

$$B_0^{*-1} \tilde{C}_0 A = \begin{bmatrix} -k_0 & 0 & ma_1^1 & 0 \\ -\alpha_0 k_0 & 0 & 0 & ma_1^2 \end{bmatrix}$$ [formula 34]

$$k_1 > (1 + \delta_{1,min})^{-1} \Big( \|\tilde{c}_1 B\| M + \delta_{1,max} |\tilde{r}_1|_{max} \Big) = (1 + \delta_{1,min})^{-1}$$ [formula 35]

$$(\alpha_0 k_0 M/m + \delta_{1,max}(a_1^1 |\dot{f}_y|_{max} + |\ddot{f}_y|_{max})),$$

$$k_2 > [\tilde{c}_2 B] M = M/m$$

Figure 3:
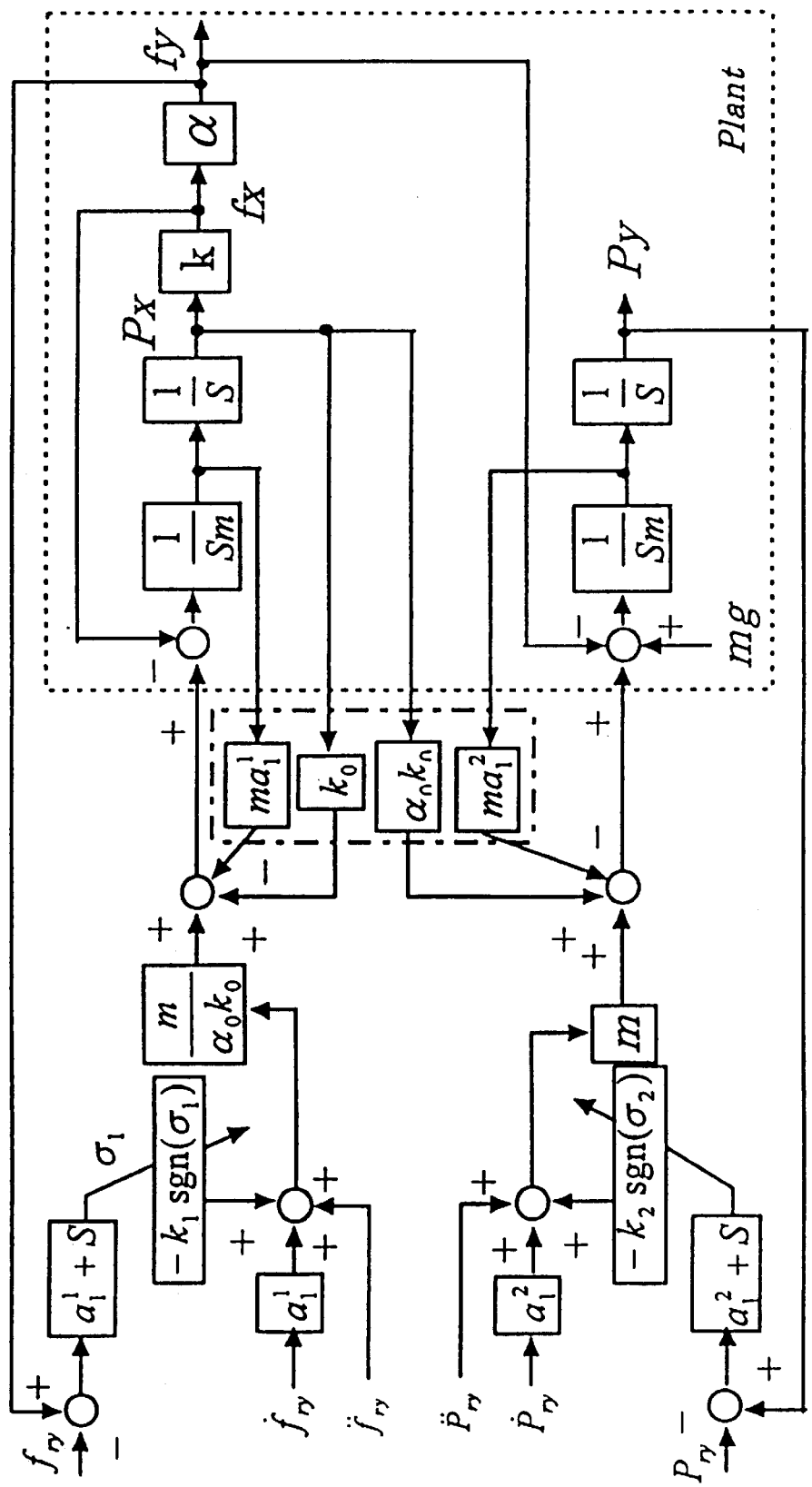
FIG. 3 is a block diagram showing an example of a grinding robot.
Figure 4:
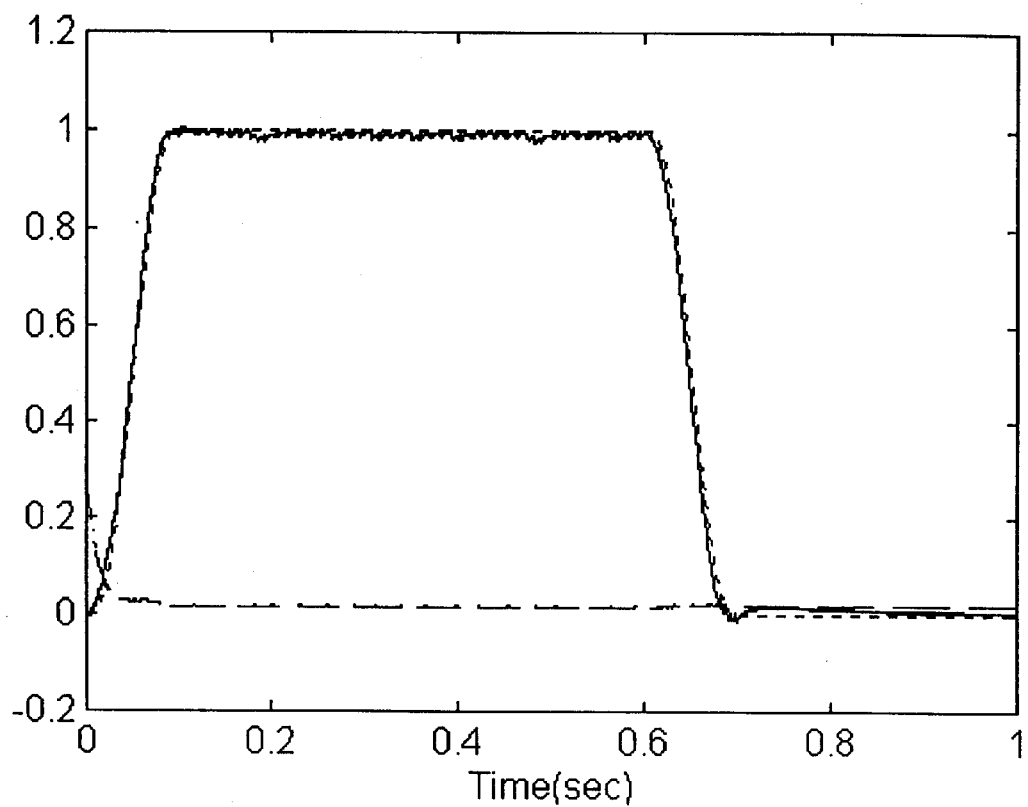
FIG. 4 is a view showing an example of simulation.

A block diagram is shown as an example of the control for realizing the control specification in FIG. 3. Also, FIG. 4 shows a simulation example in which m=0.2 (kg), $k_0=1$ (N/mm), $\alpha_0=0.5$ and the changes of $k_0$ and $\alpha_0$ are 10%. The solid line represents the frictional force $f_y$, the dotted line represents the target value $f_{ry}$, and the broken line represents a position $P_y$. Although the frictional coefficient changes, the frictional force $f_y$ to be controlled well follows the target value $f_{ry}$. Also, the position $P_y$ is deviated from the target value by about 0.4 mm in the initial stage of the control. However, the deviation is soon converged.

Figure 5:
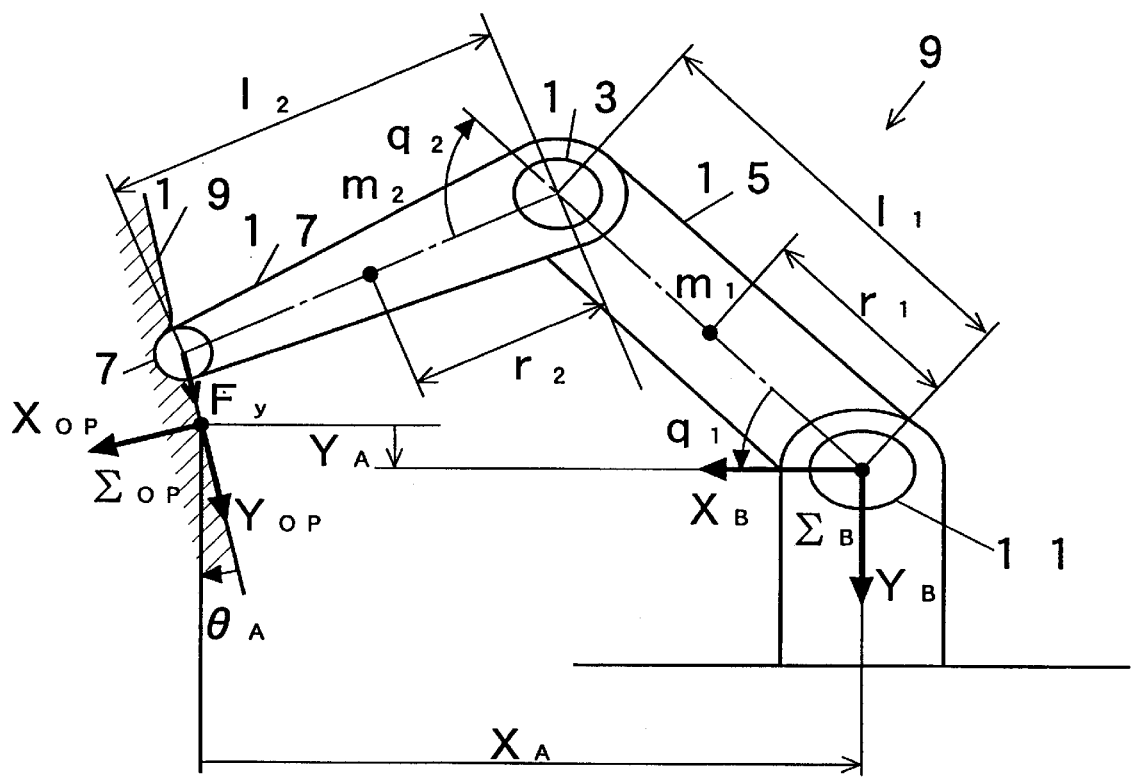
FIG. 5 is a structural view showing another embodiment of the present invention.

Subsequently, another embodiment of the invention will be described with reference to the drawings. In this embodiment, a vertical two-articulation manipulator is used in the robot. In FIG. 5, the vertical two-articulation manipulator 9 presses the work 7 against a grinding stone 19 which operates in a constant direction (a grinding belt or a buff may be used instead of the grinding stone 19), and controls the position and the frictional force of the work 7 in the working coordinate system provided on the grinding surface to thereby perform the grinding operation.

The operation will now be described with reference to FIG. 5. The vertical two-articulation manipulator 9 presses the work 7 against the grinding stone 19 (indicated by hatching) which operates in a direction $Y_{op}$ to grind the work 7. The vertical two-articulation manipulator 9 performs the control so that the position P and the frictional force $F_y$ of the work 7 become identical with the target values in the operation coordinate system $\Sigma_{op}$. For the frictional force $F_y$, torques of a first shaft 11 and a second shaft 13 of the vertical two-articulation manipulator 9 are controlled to adjust the pressure. Incidentally, the vertical two-articulation manipulator 9 has been described with respect to the two articulations but the application of the invention is not limited to the two articulations.

A method for converting the equation of motion from the articulation coordinate system to the operation coordinate system by using a Jacobian will now be described. Assume that $m_1$ is the mass of a first link 15 of the vertical two-articulation manipulator 9, $m_2$ is the mass of a second link 17 thereof, $l_1$ is the length from the first shaft 11 to the second shaft 13, $l_2$ is the length from the second shaft 13 to the grinding surface, $r_1$ is the length from the first shaft 11 to the gravitational center of the first link 15, and $r_2$ is the length from the second shaft 13 to the gravitational center of the second link 17. Also, assume that $\Sigma_B$ is the base coordinate system of the vertical two-articulation manipulator 9, $\Sigma_{op}$ is the operation coordinate system, $(X_A, Y_A)$ is the coordinate value of the original point of $\Sigma_B$ in $\Sigma_{OP}$, and $\theta_A$ is the rotational angle of $\Sigma_B$ about a Z-axis of $\Sigma_{OP}$. Also, assume that $F_y$ is the frictional force of the work 7. The equation of motion in the articulation coordinate system of the n-axis manipulator is given by the formula 36.

$$M(q)\ddot{q} + h(q,\dot{q}) + J_r^T(q)F = \tau$$ [formula 36]

where M(q)(n×n) is the inertia matrix, q(n×1) is the articulation angle, the formula 37 is the torque generated by the viscous friction, the centrifugal force, the Coriolis force and the gravitation, $J_r(q)$(n×n) is the Jacobian for joining the operational coordinate system and the articulation coordinate system, F(n×1) is the force applied from the grinding surface, and τ(n×1) is the input torque.

$$h(q,\dot{q})(n\times 1) \quad \text{[formula 37]}$$

On the other hand, if the position of the work 7 in the operation coordinate system is given by P(n×1), P is the function of the articulation angle q and given as follows:

$$P=f(q) \quad \text{[formula 38]}$$

Also, both sides of the formula 38 are differentiated so that the formula 40 is established with formula 39.

$$\dot{P},\dot{q} \quad \text{[formula 39]}$$

$$\dot{P}=J_r(q)\dot{q} \quad \text{[formula 40]}$$

where the formula 41 is established $$det[J_r(q)]\neq 0 \quad \text{[formula 41]}$$

When both sides of the formula 40 are differentiated, the formula 42 is given:

$$\ddot{q}=J_r(q)^{-1}\ddot{P}-J_r(q)^{-1}\dot{J}_r\dot{q} \quad \text{[formula 42]}$$

The formula 42 is displaced into the formula 36 and multiplied by $(J_r(q)^T)^{-1}$ from the left side. Then, the motion equation 43 in the operation coordinate system is given.

$$M_x(q)\ddot{P}+h_x(q,\dot{q})+F=(J_r(q)^T)^{-1}\tau=\tilde{u} \quad \text{[formula 43]}$$

where $M_x(q)$ in the formula 43 is given by formula 44, and $h_x(q,\dot{q})$ in the formula 43 is given by the formula 45.

$$M_x(q)=(J_r(q)^T)^{-1}M(q)J_r(q)^{-1} \quad \text{[formula 44]}$$

$$h_x(q,\dot{q})=(J_r(q)^T)^{-1}h(q,\dot{q})-M_x(q)\dot{J}_r(q)\dot{q} \quad \text{[formula 45]}$$

Subsequently, the external force is defined as follows, and the design of the control system is performed. Of the force F(n×1), the force in the normal direction on the grinding surface is generated by the resiliency, and the frictional force in the tangential direction is obtained by multiplying the normal direction force by the frictional coefficient. If the coefficient matrix K(n×n) is defined, the force F(n×1) is represented by the formula 46 taking into consideration the nominal value and the change.

$$F=K\cdot P=(K_0+\Delta K)\cdot P \quad \text{[formula 46]}$$

In this case, the elements of K(n×n) is not any desired value, but takes a structure depending upon the physical characteristics. This relates to the controllability as described later. Also, in consideration of the nominal value and the change for the inertia moment $M_x$ and the non-linear force $h_x$, these may be defined as follows:

$$M_x=M_{x0}+\Delta M_x \quad \text{[formula 47]}$$

$$h_x=h_{x0}+\Delta h_x \quad \text{[formula 48]}$$

Then, the motion equation may be represented by the following formula 49:

$$M_{x0}\ddot{P}+h_{x0}+K_0P=\tilde{u}+d \quad \text{[formula 49]}$$

where the formula 50 is established.

$$-d=\Delta M_x\ddot{P}+\Delta h_x+\Delta K\cdot P \quad \text{[formula 50]}$$

Here, the state variables are defined as follows:

$$X=\begin{bmatrix}x_1\\x_2\end{bmatrix}=\begin{bmatrix}P\\\dot{P}\end{bmatrix}, x_1, x_2 \in R^{n\times 1} \quad \text{[formula 51]}$$

Also, the formula 52 is defined as the linear input.

$$\tilde{u}=h_{x0}+u \quad \text{[formula 52]}$$

Then, the state equation of the formula 53 are obtained.

$$\begin{bmatrix}\dot{x}_1\\\dot{x}_2\end{bmatrix}=\begin{bmatrix}0_{n\times n}&I_{n\times n}\\-M_{x0}^{-1}K_0&0_{n\times n}\end{bmatrix}\begin{bmatrix}x_1\\x_2\end{bmatrix}+\begin{bmatrix}0_{n\times n}\\M_{x0}^{-1}\end{bmatrix}\tilde{u}+\begin{bmatrix}0_{n\times n}\\M_{x0}^{-1}\end{bmatrix}d \quad \text{[formula 53]}$$

Next, the observation value y(1×n) is composed of the tangential direction positions and the tangential direction forces. It is assumed that the respective components of the output are out of the dependent relationship on each other. This assumption is derived from the above-described assumption.

$$y=\begin{bmatrix}y_1\\y_2\end{bmatrix}=\begin{bmatrix}S_1F\\S_2P\end{bmatrix}=\begin{bmatrix}S_1K&0_{(1-p)\times n}\\S_2&0_{p\times n}\end{bmatrix}x \quad \text{[formula 54]}$$

where $y_1$ is the force observation component vector, $y_2$ is the position observation component vector, and $S_1$ and $S_2$ are the selection matrices selected in conformity with the use so that the respective elements of y are out of the dependent relationship on each other.

Incidentally, the switching gain is represented by the formula 55:

$$k_i(x,t) > \|\tilde{c}_{oi}B\|L(x,t)+(1+\delta_{i,\min})^{-1}\delta_{i,\max}|\tilde{r}^i| \quad \text{[formula 55]}$$

where L(x,t) in the formula 55 is given by the formula 56.

$$L(x,t)\geq \|\Delta M\cdot\ddot{P}+\Delta h_x+\Delta K\cdot P\| \quad \text{[formula 56]}$$

where ΔM, Δh and ΔK are the unknown change quantities of M, h and K, respectively.

Assume that the articulation input torque τ(t) of the manipulator 9 is given by the formula (57).

$$\tau(t)=J_r^T(u+h_{x0}(q,\dot{q})) \quad \text{[formula 57]}$$

$$=J_r^T\left(-B_0^{*-1}\tilde{C}_0AX+B_0^{*-1}\bar{u}+B_0^{*-1}\dot{r}(t)\right)$$

where u in the formula 57 is given by the formula (58).

$$\bar{u}=-\begin{bmatrix}k_1\text{sgn}(\sigma_1(t))\\k_2\text{sgn}(\sigma_2(t))\end{bmatrix} \quad \text{[formula 58]}$$

Figure 6:
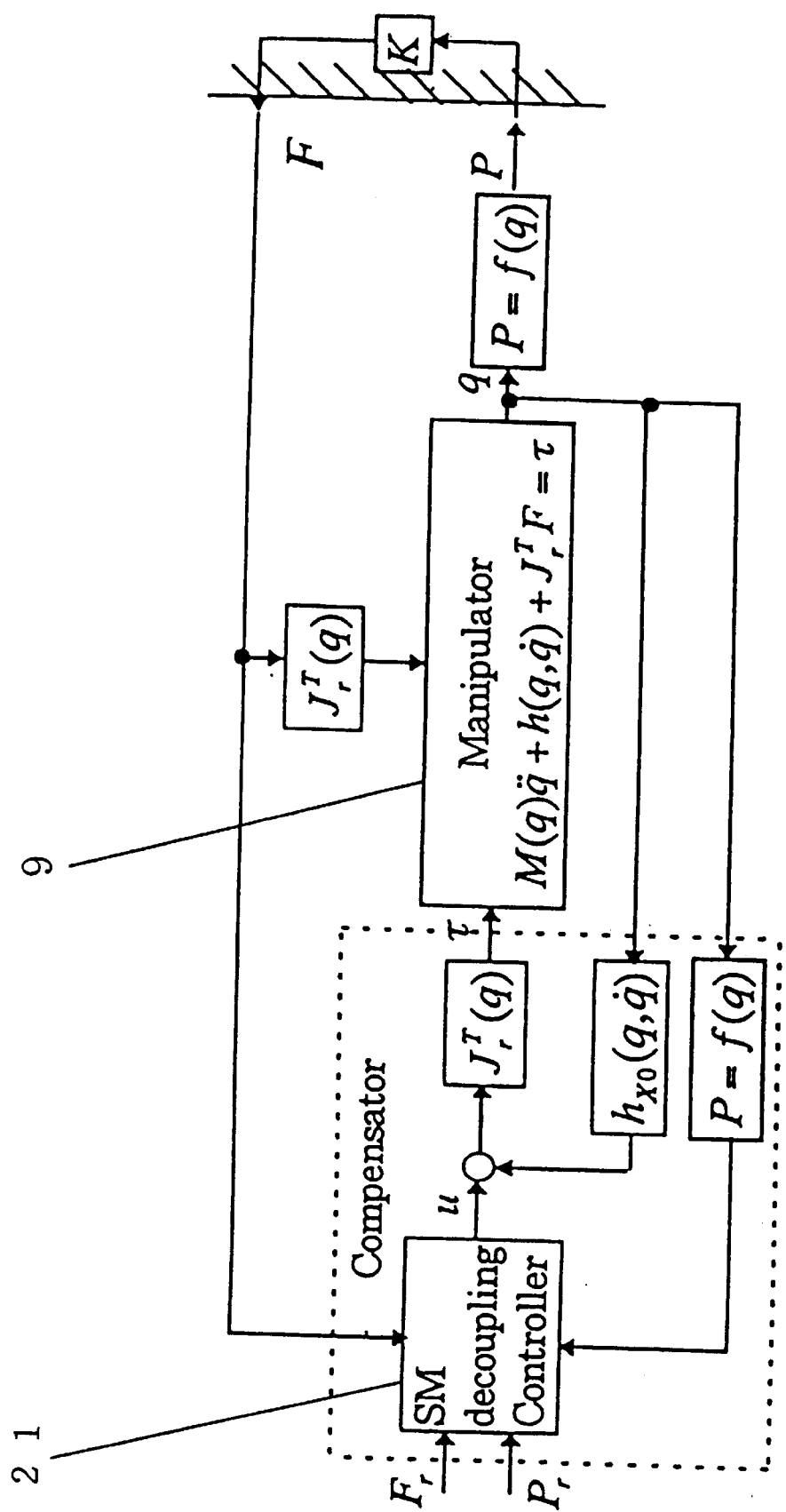
FIG. 6 is a block diagram showing a control system for a multi-articulation grinding robot using a sliding mode decoupling control.

FIG. 6 is a block diagram of the control system. In a sliding mode decoupling controlling section 21, the target value $P_r$ of the tangential direction position and the target value $F_r$ of the frictional force are inputted. Then, the target values are compared with the tangential direction position P and the tangential force F to seek the errors therebetween. Then, the calculation on the basis of the sliding mode decoupling control is performed so that a control input signal u is outputted. Reverse dynamics of the non-linear force $h_{x0}$ is added to the control input signal u. The addition signal is converted into the articulation torque through the Jacobian and inputted into the vertical two-articulation manipulator 9.

Also, FIG. 7 shows the simulation result under the condition that the frictional coefficient $\alpha_0$ is 0.5, the elastic coefficient $k_0$ is 1,000 (N/m), and the changes of $\alpha_0$, $k_0$ and $M_{x0}$ are 10%. The solid line represents friction force $F_y$, the dotted line represents target value $F_{ry}$, and the dashed line represents the position $P_y$ in the Y direction of the work 7 and the target value Pry=0. From this example, it is understood that $F_y$ and $P_y$ follow the target values and the robust hybrid control system against the parameter changes is realized.

As described above, the motion equation of the manipulator 9 is converted from the articulation coordinate system to the operation coordinate system by using the Jacobian so that the sliding mode decoupling control may be applied to the position and friction control of the robot and the position and friction control may be performed with high precision for the multi-freedom degree grinding robot. Also, for the known parameter change such as the function term of the articulation angle in the motion equation intrinsic in the manipulator 9, the reverse dynamics are considered and the non-linear input of the sliding mode decoupling control compensates for the unknown parameter change only. Accordingly, it is possible to reduce the generation of the chattering intrinsic in the sliding mode control.

As described above, according to the present invention, the position and force control apparatus is composed by using the sliding mode decoupling control, and the non-linear input gain is determined in consideration of the case where the C matrix has the uncertainty. It is therefore possible to perform the robust control that may respond to the changes.

Also, according to the present invention, the equation of motion of the manipulator is converted from the articulation coordinate system to the operation coordinate system so that the ad sliding mode decoupling control means may be applied to the multi-articulation grinding robot. In an perpendicular manipulator, the high precision grinding of the complicated surface which could not be attained due to the limit of the degree of freedom may be attained.

Furthermore, according to the present invention, the non-linear input to the sliding mode decoupling control is limited only to the unknown parameter change so that the generation of the chattering of the multi-articulation grinding robot using the sliding mode decoupling control may be suppressed.

Furthermore, the present invention can be applied to any machining apparatus, that is, not only grinding apparatus but also buffing apparatus, polishing apparatus, finishing apparatus or the like.

Various details of the invention may be changed without description of the embodiments according to the present invention is provided for the purpose of illustration only, and not for the purpose of limiting the invention as defined by the appended claims and their equivalents.

What is claimed is:

1. A position and/or force controlling apparatus using a sliding mode decoupling control system comprising: decoupling means for decoupling an interacting term existing in the control system on the basis of a regular condition of a decoupling matrix; and sliding mode controlling means for converging a control quantity along a hyperplane which is sought under the condition to satisfy the Lyapunov stability condition for the control system decoupled by the decoupling means; wherein gain for a non-linear input factor existing in the control system is set to a value large enough to satisfy the Lyapunov stability condition so that the control quantity converges on the hyperplane in a stable manner even when there is an uncertainty in the C matrix, and the C matrix connects state variables of an object to be controlled with an output of the object.

2. A position and/or force controlling apparatus using a sliding mode decoupling control system according to claim 1; wherein the gain is greater than a predetermined value when there is no uncertainty in the C matrix.

3. A position and/or force controlling apparatus using a sliding mode decoupling control system according to claim 1; further comprising a machining device for machining a predetermined surface of a workpiece; and a robot for pressing the workpiece against the machining device or a robot for pressing the machining device against the workpiece fixed at a predetermined position in space; wherein the control quantity includes at least one of a frictional force, in a tangential direction, generated in the machining surface in which the workpiece is in contact with the machining device, and a position in the tangential direction, and the uncertainty of the C matrix depends upon at least one of changes in an elasticity coefficient and a frictional coefficient of the machining surface.

4. A position and/or force controlling apparatus using a sliding mode decoupling control system according to claim 3; wherein the machining device is a grinding device.

5. A position and/or force controlling apparatus using a sliding mode decoupling control system according to claim 3; wherein the machining device is a buffing device.

6. A position and/or force controlling apparatus using a sliding mode decoupling control system according to claim 3; wherein the machining device is a polishing device.

7. A position and/or force controlling apparatus using a sliding mode decoupling control for controlling at least one of a position and a frictional force through a robot having at least one articulation, comprising: a control object controlled and designed in advance on the basis of an equation of motion in an operation coordinate system of the robot in which the equation of motion in an articulation coordinate system of the robot is converted from the articulation coordinate system to the operation coordinate system by a Jacobian matrix; sliding mode decoupling controlling means for compensating for a non-linearity inherent in the robot on the basis of at least one of errors between a target value of a force in the operation coordinate system and a detection value of a force and errors between a target value of a position in the working coordinate system and a detection value of the position; articulation torque calculating means for calculating articulation torque values of the robot on the basis of a control input signal obtained by the robot on the basis of a control input signal obtained by the sliding mode decoupling controlling means; and articulation drive means for driving each articulation on the basis of each articulation torque value calculated by the articulation torque calculating means.

8. A position and/or force controlling apparatus using a sliding mode decoupling control according to claim 7; wherein the articulation torque calculating means calculates each articulation torque value of the robot on the basis of an addition signal in which reverse dynamics representative of a known parameter change are added to the control input signal.

* * * * *